PROCESS FOR TELEVISION TRANSMISSION

Filed Oct. 20, 1953 2 Sheets-Sheet 1

INVENTOR:
FRIEDRICH HERZ
BY Leon M. Strauss
AGT

PROCESS FOR TELEVISION TRANSMISSION

Filed Oct. 20, 1953 2 Sheets-Sheet 2

Inventor:
FRIEDRICH HERZ
BY [signature]
AGT.

1

2,899,496

PROCESS FOR TELEVISION TRANSMISSION

Friedrich Herz, Berlin-Zehlendorf, Germany

Application October 20, 1953, Serial No. 387,134

Claims priority, application Germany October 21, 1952

3 Claims. (Cl. 178—7.5)

Figure 3:
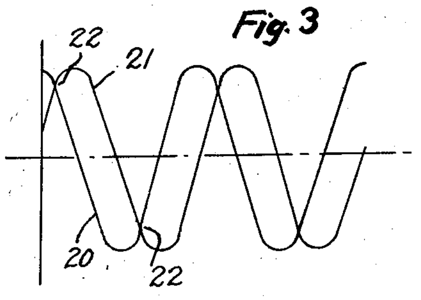

This invention relates to television transmission systems and processes.

It is an object of the present invention to provide means affording greatly simplified and highly efficient television scanning systems and techniques, which necessitate employment of only a minimum of special equipment for producing image-forming line patterns on the screen of the receiver, and which require no servicing or adjustment of the synchronization between said receiver and the transmitter.

It is another object of the present invention to provide means ensuring distortion-free reception of televised images due to deflection of the scanning beam along parallel and rectilinear paths at least within the confines of the screen of the receiver.

It is still another object of the present invention to provide means facilitating a simplification of the line patterns employed during scanning and a more uniform distribution of light over the entire frame or screen area scanned, whereby reception of pictures of good and uniform quality is enhanced.

In heretofore known television transmission systems the control of the construction of an image in the receiver is normally accomplished by transmitter impulses in the intervals between the transmission of the contents of the image, i.e., by interlaced scanning. The transmission of the deflection voltages, which are to be applied to the cathode-ray tube and which are necessary for the transmission of the image, is difficult, however, particularly when a larger band width is required.

According to this invention it is proposed to make the deflection voltages sine-shaped. Since in this case the sinusoidal oscillations cross somewhere within the confines or viewing area of the image screen, a non-uniform scanning arises. For simple installations, this process may be adequate. However, if higher standards of uniformity are required, then in accordance with a further proposal of the invention, a second oscillation with double line frequency, i.e., with a frequency double the frequency of the vertical deflection voltage, is superimposed on the horizontal deflection voltage for the image sequence. This second oscillation serves to lead the straight or linear parts of the sinusoidal oscillations parallel to the direction of up and down movement of the light spot at the line frequency, to lengthen them and thus to displace the points of intersection of the advancing and return traces of the lines to the edge of the image screen. It is preferable to make this additional frequency also sinusoidal in shape. The frequency of the image deflection voltage must undergo a phase shift at the points where the differential quotient of the image series frequency is zero. By virtue of the phase of this accessory or additional oscillation, the return lines or traces are located centrally between the incoming lines or traces.

A further refinement of the invention consists of retaining the line and image oscillations, or one of the two, in sinusoidal form only during transmission. However during the video pick-up and reproduction stage, preferably just before or in the image or picture tube, they are given a distortion which imparts to them a uniform recording speed and a likewise uniform interval between the lines. The distortion is achieved preferably by means of otherwise interfering tangential distortion characteristics of the image or picture tube or through a special shape of the image screen, particularly through curvature thereof.

The transmission of the deflection frequency is, in accordance with the invention, preferably accomplished via a frequency-modulated sound channel, and specifically at such points where this channel is not used, or is only partially used, for the transmission of speech and music. By virtue of the employment of the frequency-modulated sound channel for the transmission of the deflection frequencies, the latter are received as constant and little-disturbed use voltages.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therein as do not affect the spirit of the invention nor exceed the scope thereof as expressed in the appended claims.

Figure 4:
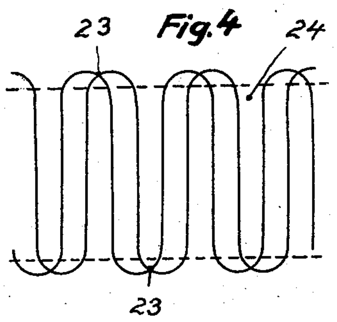
Figures 1, 2:
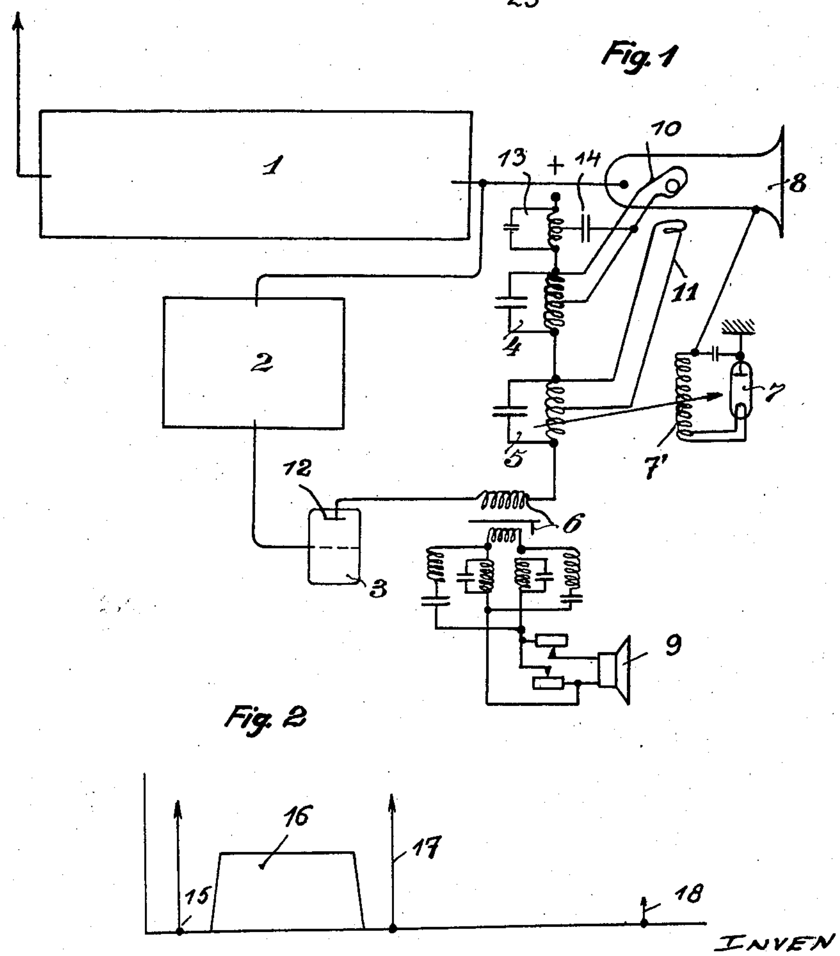
Figure 5:
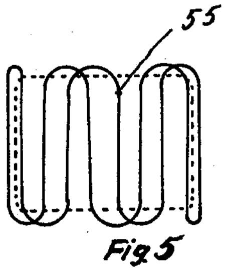
Figure 6:
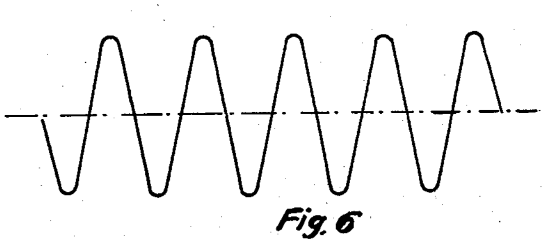
Figures 7, 8:
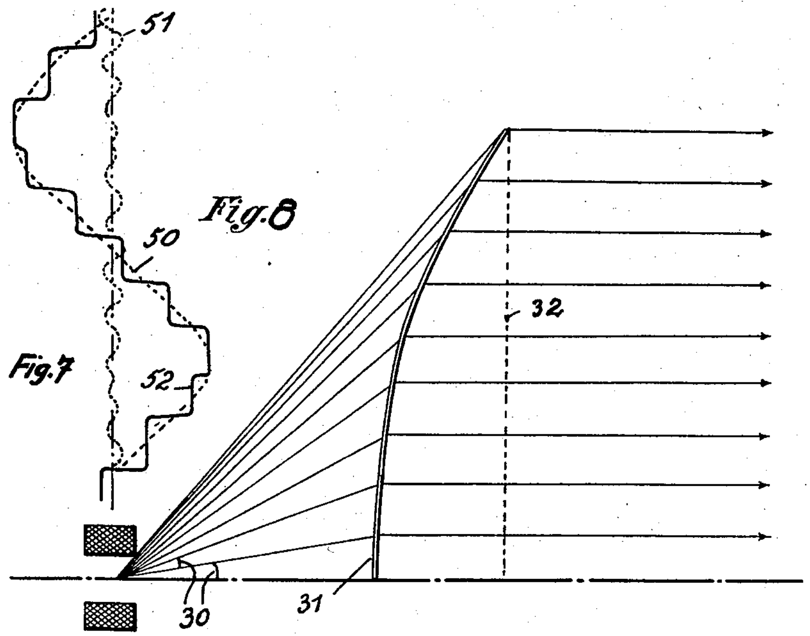
Figure 9:
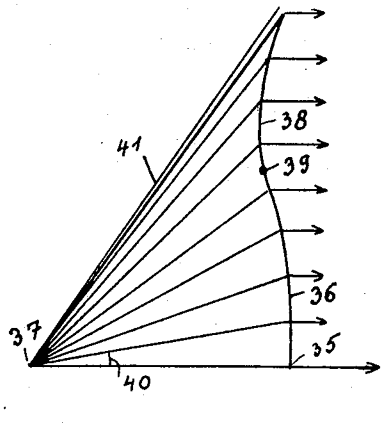
Figure 10:
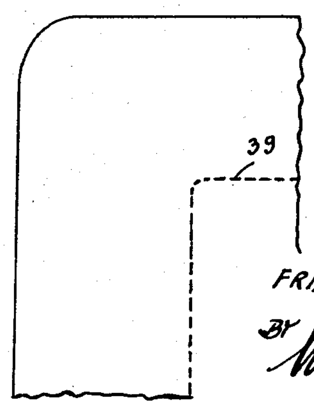

Fig. 1 is a circuit diagram of a receiver employed in a television transmission system embodying the invention, Fig. 2 is a graphic illustration of the low-frequency use of the sound channel, Fig. 3 is a diagrammatic illustration of a line pattern forming a received picture and composed of sinusoidally varying lines in which the intersection points lie in the viewing area of the pattern, Fig. 4 is a diagrammatic illustration of a line pattern forming a received picture and composed of sinusoidally varying lines in which the intersection points are moved outside the actual area of the image, Fig. 5 is a diagrammatic illustration of a line pattern forming a received picture and composed of sinusoidally varying lines and showing the latter as they appear on the screen, Fig. 6 is a graph of deflection the line voltage, employed in carrying out the invention, versus time, Fig. 7 is a graph of the image sequence frequency with a superposed special frequency, Fig. 8 diagramatically shows a screen having a bent screen surface according to the invention, Fig. 9 diagrammatically shows a screen with a doubly bent screen surface according to the invention, and Fig. 10 is a partial front view of a screen.

Referring now more particularly to Fig. 1, the receiver consists of video section 1, which is familiar as far as its circuit construction is concerned, and which in the illustration is only designated by a rectangle or block, and of a sound section 2, which is similarly familiar. It is to be noted that the end stage is not contained in rectangle 2.

Immediately below rectangle 2 is shown a tube 3 constituting a part of the final stage of the sound section of the receiver. This tube 3 simultaneously energizes loudspeaker 9 and deflection coils 10, 11 of cathode-ray tube 8.

The high-frequency sound channel, i.e., the frequency range designed for the transmission of music and speech, is, according to the invention, at the same time used to transmit the deflection voltages, the frequencies of which actually belong in the high-frequency image or video channel, i.e., that frequency range which is designed for the transmission of the image. The deflection voltages themselves are given a sinusoidal shape; they are taken from the alternating voltages of anode or plate 12 by means of filter elements 4, 5 and 13, and are then fed to deflection coils 10, 11 constituting the horizontal and vertical deflection means, respectively, of the picture or cathode-ray tube. Transformer 6, which is connected in the anode circuit, takes the speech and music from the anode voltages.

The sound channel also serves a low-frequency purpose, as may be better visualized from Figure 2. Thus, the image sequence pattern is transmitted at a very definite frequency 15, which serves to distribute the image lines over the image screen. The speech and music are transmitted over a single frequency over a frequency-range 16 and the line frequency 17, which serves to move the image point on the screen up and down. Finally a special frequency 18, the voltage of which can be especially small, is transmitted. This last-named frequency has, in accordance with the invention, special tasks to fulfill, as shall be more specifically explained below. All of the frequencies 15 to 18 just mentioned are so arranged in the low-frequency sound channel that they do not mutually interfere with each other.

Referring now to Fig. 3, there is shown an image line pattern which arises through use of the image sequence frequency and the line frequency. The sinusoidal line 20 represents the advancing trace, while the sinusoidal line 21 represents the return trace. In the course of this scanning process, intersection points 22 arise having a luminous intensity which is twice as strong as that of any other portion of the lines. Under certain circumstances, this difference can be disadvantageous. In order to avoid this disadvantage, in accordance with the invention, the intersection points are displaced so far upwards and downwards that they lie at 23, outside of the image surface 24, as may be seen from Fig. 4. This is accomplished by means of the above-mentioned special frequency 18, which is taken from the alternating current at anode 12 by means of oscillating circuit 13 and is fed through capacitor 14 to the horizontal deflection coil 10.

Through this special frequency not only are the intersection points displaced upwards and downwards relative to the image frame, but at the same time a further advantage is achieved, namely that the undulated and oblique-lying sections of the sinusoidal lines, as shown in Fig. 3, are not only partly evened out, but in addition are straightened out parallel to each other, as shown in Fig. 4. In this advantageous way a simplification of the image line pattern and more uniform distribution of the light are achieved, than is possible in the case of a picture based on a line or scanning pattern such as that of Fig. 3.

The manner in which the composition of the scanning line pattern from the individual oscillations is achieved, is shown more clearly in Figs. 5 to 7. The time base or sweep of the deflection voltages or currents for the vertical lines is shown in Figure 6 and is transmitted by coil 11 to the cathode-ray tube. The time base or sweep of the horizontal deflection voltages is shown in Figure 7 and is transmitted to the cathode-ray tube by coil 10. It may be further seen from Figure 7, how the complex frequency voltage 52 is formed from the fundamental waves 50. The superposition of frequency 51 is done by capacitor 14, in which case the current in question is taken from oscillatory circuit 13.

Through the joint effect of the two currents or voltages illustrated in Figs. 6 and 7, an image point line 55 (see Fig. 5) arises on the image screen.

Since in addition, in accordance with the invention, the image sequence frequency is transferred to the sound channel, these image sequence frequencies share in the advantages of frequency modulation, so that they produce the same size of image independent of the field strength of the transmitter. Moreover, these frequencies are relatively unaffected by external interferences. Since the transmission according to the invention is based on sinusoidal oscillations, then, corresponding to the nature of every sine function, the recording speed, i.e., the rate at which light spot or line moves across the screen, is smaller in the neighborhood of the peak points of the deflection voltages than in the middle parts thereof. Also, the line density is greater, i.e., the spacing between the lines is narrower, at the reversal points. This would result in certain disadvantages in connection with the uniformity of the image transmission. Therefore, in accordance with the invention, a further arrangement is proposed, which pulls the sine frequencies in the neighborhood of the peak points away from each other, so that a uniform recording speed and line density is guaranteed over the whole surface of the image. This can be achieved in projection receivers by having the screen, on which the projection of the image is done, variably inclined toward the viewer at different individual parts. This is particularly achieved by curving the screen.

The tangential distortion in the border areas of the screen, which is otherwise considered a nuisance in cathode-ray tubes, can here, by means of the invention, positively be used as an advantage, in that in a skillful way a compensation of individual effects that are in themselves disadvantageous occurs, through which a practically perfect uniformity of the speed of motion of the image points is achieved on all parts of the screen. Since, in accordance with the invention, it is a matter of a specially strong tangential distortion, so that the desired compensation can be achieved, cathode-ray tubes of small overall length are used, which have the quality of a particularly strong tangential distortion. However, this reduction in length results in the further advantage of a decrease in the total dimensions of the television receiver.

An example of a special shape or configuration of an image screen with curved surface is represented in Fig. 8. The individual rays shown are, as far as their angular separation 30 is concerned, so distributed, that when a straight projection surface 32 is arranged, a sinusoidal distribution arises. However, this distribution does not exactly correspond to the conditions of the cathode-ray tube. In such a tube, the deflection angle increases linearly with the deflection current or voltage. These conditions are represented in Fig. 9. The rays 41 here form deflection angles 40 with each other. In order to now attain a uniform speed of the image point movement over the whole screen surface as well, the screen is given a double curved form. In this embodiment, in the neighborhood of the middle 35 of the screen, the screen is provided with portions 36 curved concavely relative to terminal point 37 of the rays, while portions 38 of the screen lying nearer to the periphery of the screen and further away from point 37 are convexly curved relative to said point, so that at the transition points between the convexly and concavely curved parts of the screen a reversing line 39 arises.

A further characteristic of heretofore known television receivers is that the high voltage generating circuit is directly connected to the deflection voltage generating circuit. In accordance with the invention, on the other hand, as shown in Fig. 1, the high voltage output is taken from oscillatory circuit 5 by means of associated transformer 7' and, with the aid of a suitable high voltage rectifying tube 7, is fed to cathode-ray tube 8.

Having thus described the invention, what is claimed as new and desired to be secured by Letters Patent, is:

1. In a television system; a receiver including a cathode-ray tube provided with a curved screen, a cathode-ray source for directing a cathode-ray beam at said screen, and vertical and horizontal deflection means positioned adjacent the path of said beam, first means operatively connected to said vertical deflection means for applying to the latter first sinusoidally varying deflection potentials of a predetermined frequency for moving said cathode-ray beam up and down over said screen so as to tend to thereby produce vertical lines on said screen, second means operatively connected to said horizontal deflection means for concurrently applying to the latter second sinusoidally varying deflection potentials for displacing said lines back and forth across said screen, and third means operatively connected to said second means for superimposing onto said second deflection potentials additional sinusoidally varying potentials of a frequency substantially double said frequency of said first deflection potentials, to thereby parallelize those portions of both the advancing and return traces of said lines on said screen and falling within the viewing area of the latter, the curvature of said screen adjacent the outer edges thereof being convex toward said cathode-ray source, the curvature of said screen adjacent the central portion thereof being concave toward said cathode-ray source.

2. A television system comprising a receiver including a cathode-ray tube provided with a screen, means for directing a cathode-ray beam at said screen, vertical and horizontal deflection means positioned adjacent the path of said beam, first means operatively connected to said vertical deflection means for applying to the latter first sinusoidally varying deflection potentials of a predetermined frequency for moving said cathode-ray beam up and down over said screen so as to tend to thereby produce vertical lines on said screen, second means operatively connected to said horizontal deflection means for concurrently applying to the latter second sinusoidally varying deflection potentials for displacing said lines back and forth across said screen, and third means operatively connected to said second means for superimposing onto said second deflection potentials additional sinusoidally varying potentials of a frequency substantially double said frequency of said first deflection potentials, to thereby parallelize those portions of both the advancing and return traces of said lines on said screen and falling within the viewing area of the latter.

3. A television system comprising a receiver including a cathode-ray tube provided with a curved screen, means for directing a cathode-ray beam at said screen, the curvature of said screen adjacent the central portion thereof being concave towards said means, first means operatively connected to said vertical deflection means for applying to the latter first varying deflection potentials of a predetermined frequency for moving said cathode-ray beam up and down over said screen so as to tend to thereby produce vertical lines on said screen, second means operatively connected to said horizontal deflection means for concurrently applying to the latter second varying deflection potentials for displacing said lines back and forth across said screen, and third means operatively connected to said second means for superimposing onto said second deflection potentials additional varying potentials of a frequency substantially double said frequency of said first deflection potentials, to thereby parallelize those portions of both the advancing and return traces of said lines on said screen and falling within the viewing area of the latter.

References Cited in the file of this patent

UNITED STATES PATENTS

| | | |
|---|---|---|
| 2,172,775 | Schmidt-Ott et al. | Sept. 12, 1939 |
| 2,186,634 | DuMont | Jan. 9, 1940 |
| 2,201,309 | Goldsmith | May 21, 1940 |
| 2,227,822 | Campbell | Jan. 7, 1941 |